…

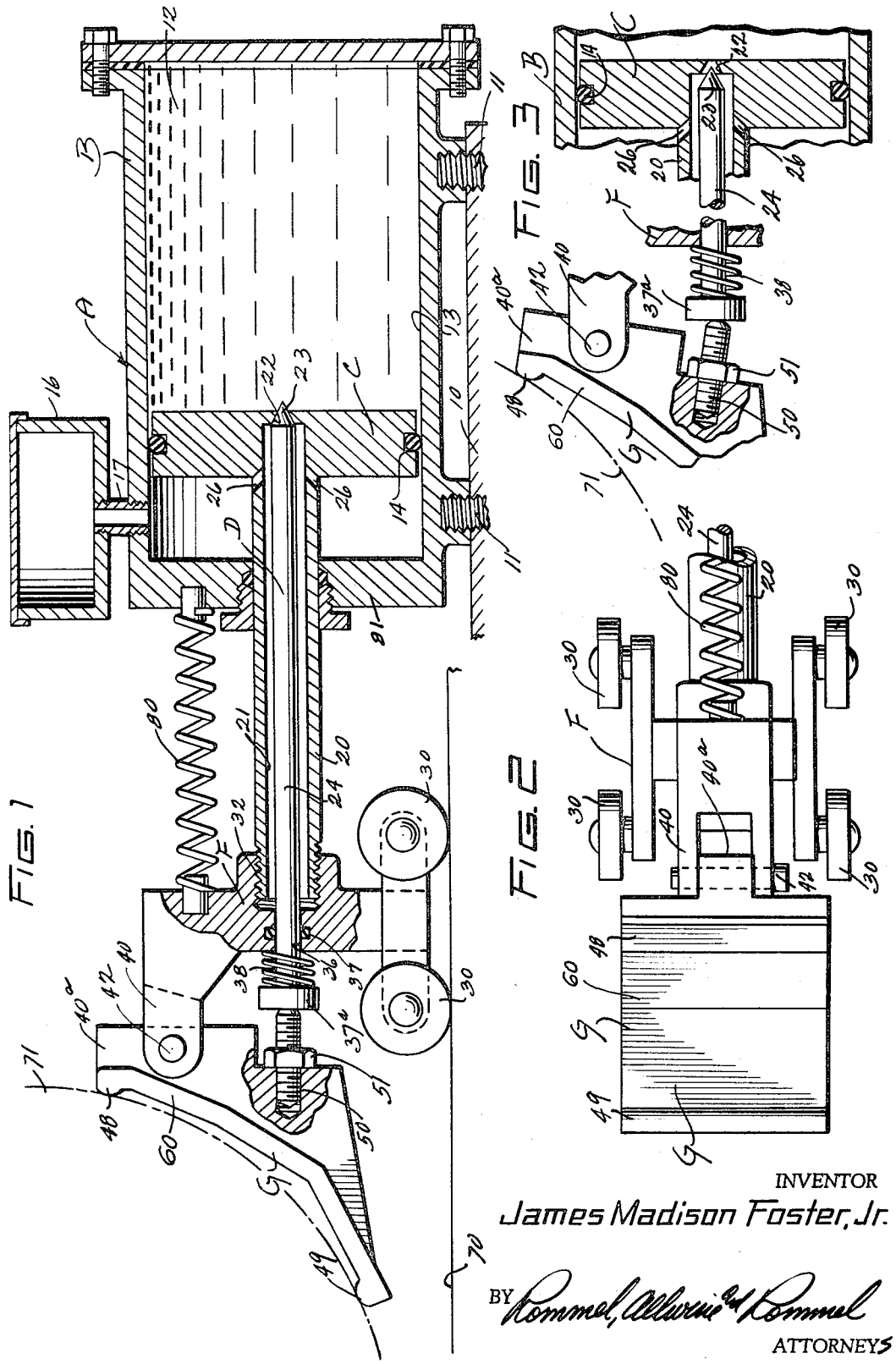

United States Patent Office 3,395,779
Patented Aug. 6, 1968

3,395,779
WHEEL STOPPING DEVICE
James Madison Foster, Jr., Memphis, Tenn., assignor to R. Lee Fraser, doing business as Diversified Engineering Co., Memphis, Tenn.
Filed Aug. 29, 1966, Ser. No. 575,715
6 Claims. (Cl. 188—32)

ABSTRACT OF THE DISCLOSURE

A stopping device that automatically balances weight and forward horizontal forces of a rolling object for stopping the object in a minimum travel distance with minimum shock.

---

The present invention relates to a movement stopping device for rolling objects, such as, wheels, logs, paper rolls and the like.

The primary object of this invention is the provision of a stopping device for applying a maximum stopping force to a rolling object, such as a vehicle wheel, where velocity times weight (energy) and wheel diameter vary within certain limits.

A further object of this invention is the provision of a device adapted to stop and at the same time damp the stopping action of a rolling object by application of a maximum stopping force under such circumstances that the rolling object can be stopped within a very short distance.

A further object of this invention is the provision of a wheel stopping device adapted to be utilized in connection with the stopping of the wheels of a vehicle, in which hydraulic means is utilized for quickly and effectively stopping the vehicle within a very short distance.

A further object of this invention is the provision of a wheel stopping device in which a fixed cylinder, adapted to contain a liquid, and having a piston and valve means adapted to be controlled by a rolling wheel for damping the force application of the wheel and stopping the same within a very short distance.

A further object of the invention is to provide a stopping device which maintains a constant stopping force, since any change in the applied force will cause a wheel or other round rolling object to change its position and in so changing will change the resistive stopping force.

Other objects and advantages of this invention will be apparent during the course of the following detailed description.

In the accompanying drawing, forming a part of this specification, and wherein similar reference characters designate corresponding parts throughout the several views.

FIG. 1 is a longitudial cross sectional view taken through the improved wheel stopping device.

FIG. 2 is a fragmentary plan view of the rear portion of the wheel stopping device.

FIG. 3 is a fragmentary cross sectional view showing the action of a wheel or rolling object in opening a valve for the bleeding of liquid from one side of a piston operating within a cylinder to the other side thereof.

In the drawing, wherein for the purpose of illustration is shown only a preferred embodiment of the invention, the letter A may generally designate the movement stopping device. It may be utilized for the purpose of stopping the rolling action of vehicle wheels, logs, paper rolls, or any other rolling object. It comprises a fixed cylinder B in which a piston C operates. The cylinder C is preferably adapted to receive a liquid 12. A valve means D is provided, operatively associated with the piston C and its piston rod. A movable frame F is provided, to which the valve means D is connected. This frame F has a member or sensor means G movably mounted thereon adapted to initially take the force of a rolling object and quickly damp and stop the rolling action through release of the liquid through the valve from one side of the piston to the other side thereof.

The cylinder B is preferably mounted on a horizontal axis and fixed to some foundation 10 as by means 11. It is adapted to contain the liquid 12. The piston C is slidable within the chamber 13 of the cylinder and it is provided with a sealing gasket 14 on its outer periphery. The cylinder B is provided with the usual overflow reservoir 16 having a pipe connection 17 with the chamber 13 at the end of the cylinder rearwardly beyond the piston C in its maximum extended position.

The piston C is provided with a tubular piston rod 20 connected therewith having a passageway 21 therealong. A tapered valve seat 22 is provided at the center of the piston C adapted to receive the conical end 23 of a valve rod 24, which is capable of moving longitudinally in the piston tube chamber 21 in order to open and close the valve 23 upon its seat 22. Ducts 26 are provided in the piston rod 20 at the rear side of the piston for the purpose of bleeding liquid 12 from the forward side of the piston C to the rear side thereof.

The frame F is in the nature of a carriage, provided with rollers or wheels 30 thereon. The piston rod tube 20 is detachably connected to the frame F at 32. The valve rod 24 extends through a passageway 36 horizontally provided in the carriage F. A gasket 37 is mounted on the frame or carriage F to prevent leakage of the liquid. The valve rod 24 is provided at its rear end with a head 37a. A spring 38 is compressed between the head 37a and the frame F for normally opening the valve 23.

The frame or carriage F above the tubular piston rod 20 is provided with a rear extension 40 upon which a forward extension 40a of shoe G is movably mounted, as by pivot 42. The sensor means G includes a shoe 60 which has its pivot 42 located at the upper end thereof and the bottom portion extends downwardly and rearwardly to a point which is a considerable distance rearwardly from the upper end of the shoe, measured in a horizontal direction. The shoe 60 may assume various shapes, but it is shown as forwardly socketed and provided at its upper end with a rearwardly extending contact area or point 48 and at its lower end it has a rearwardly extending lower contact point or area 49.

Below the pivot axis 42 the shoe 60 is provided with an adjustable screw or like member 50 which may be threaded in the shoe. It is preferably horizontally positioned when the valve 23 is closed and may be locked in place by a nut 51. The screw 50 acts as operation means to cam against the head 37a of the valve and control the position of the valve.

In normal operation it will be noted that the shoe 60 is located in spaced relation above the rolling surface 70 over which the object or wheel 71 rolls. The rolling object 71 first engages the lower contact point 49 and closes the valve 23. As the rolling object 71 rises on the shoe 60, such for instance as shown in FIG. 3, it will engage the upper contact point or area 48 and pivot the shoe 60 on its axis 42. This will move the screw 50 rearward, camming on the head 37a to the position shown in FIG. 3. The spring 38 will force the valve 23 to an opened position, thus enabling the liquid 12 to pass through the seat 22 and through the ducts 26 to the rear side of the piston C. Thus the shock energy is absorbed. The reduced liquid pressure in cylinder B allows member F to move horizontally toward cylinder B and thus the wheel, because of reduced horizontal resistance, and because of its weight, then presses the lower contact point 49 of the shoe 60 and closes the valve 22, increasing the liquid pressure in cylinder B. By a repetition of this action (the rise and descent of the wheel on sensing points 48 and 49 of shoe 60), the horizontal force of the wheel is balanced by an opposing liquid pressure force until the horizontal movement of the wheel is stopped.

It will be noted that a compressed retracting spring 80 is mounted between the rear end 81 of the cylinder B and the frame F for the purpose of returning carriage when the rolling object is removed from the shoe 60.

Various changes in the shape, size, and arrangement of parts may be made to the form of invention here shown and described, without departing from the spirit of the invention or the scope of the claims.

I claim:

1. In a wheel stopping device the combination of a fixed cylinder, a liquid in the fixed cylinder, a piston operating in the fixed cylinder having a valve opening therethrough to permit the liquid to pass from one side of the piston to the opposite side thereof, a tubular piston rod connected to said piston extending rearwardly from the cylinder, a movable carriage connected to said piston rod beyond the cylinder, biasing means normally retracting the carriage rearwardly away from said cylinder, a movable valve rod for said valve opening extended through said tubular piston rod having its rear end slidably extended through said carriage in sealed relation therewith, means normally biasing said valve rod to an opened position, a wheel engaging shoe pivoted upon said carriage on an axis above the piston rod, said shoe having an upper end and thence extending rearwardly and downwardly and having a lower end located rearwardly of the upper end whereby a wheel will engage said lower end first to close the valve and as it continues moving will release the lower end to pivotally move the shoe, and means connected with said shoe at a location below its pivot axis adapted to engage the valve rod and close the valve at the contact of the wheel against the lower portion of the shoe but which upon pivotal movement of the shoe when the wheel engages the upper portion of the shoe will move away from the valve rod to permit the valve rod biasing means to open said valve.

2. In a movement stopping device for a rolling object, the combination of an anchored cylinder, liquid in the cylinder, a piston slidable in said cylinder adapted to act against the liquid, a rod attached to the piston, a frame connected to said piston rod spaced from the cylinder and movable with the piston rod, valve means to control passage of the liquid from one side of the piston to the other side thereof within the cylinder, a vertically positioned sensor means movably connected to the frame and arranged to operate the valve means so as to decrease the liquid pressure in the cylinder as a rolling object engages and rises on the sensor means and to move the sensor means and the frame and piston rod to increase the liquid pressure in the cylinder as the rolling object descends with respect to the sensor means to move away from the cylinder.

3. The stopping device described in claim 2 in which biasing means is provided normally urging the piston into an extended position.

4. The stopping device as described in claim 3 in which biasing means is provided normally acting to open said valve means.

5. The movement stopping device as described in claim 2 in which the rolling object engaging sensor means is pivoted on the frame and in which the pivot axis of said sensor means lies above the valve means and location of contact of the sensor means with the valve means.

6. The movement stopping device as described in claim 5 in which the rolling object engaging sensor means has a lower contact area which a rolling object first engages to cause the valve to close.

References Cited
UNITED STATES PATENTS

| | | | |
|---|---|---|---|
| 2,559,633 | 7/1951 | Katz | 188—88 |
| 2,666,502 | 1/1954 | Fee | 188—32 |
| 3,040,667 | 6/1962 | Shaffer | 188—88 X |
| 3,299,989 | 1/1967 | Santosuosso | 188—32 |

MILTON BUCHLER, *Primary Examiner.*

T. W. BUCKMAN, *Assistant Examiner.*